US008794255B2

(12) United States Patent
Crabtree

(10) Patent No.: US 8,794,255 B2
(45) Date of Patent: Aug. 5, 2014

(54) ADDITIVE PROPORTIONING SYSTEM

(76) Inventor: Dennis Wayne Crabtree, Beaumont, TX (US)

( * ) Notice: Subject to any disclaimer, the term of this patent is extended or adjusted under 35 U.S.C. 154(b) by 0 days.

(21) Appl. No.: 13/589,095

(22) Filed: Aug. 18, 2012

(65) Prior Publication Data
US 2013/0048099 A1 Feb. 28, 2013

Related U.S. Application Data

(60) Provisional application No. 61/527,148, filed on Aug. 25, 2011.

(51) Int. Cl.
*G05D 11/00* (2006.01)
(52) U.S. Cl.
USPC ............... 137/99; 137/109; 137/897; 418/28; 418/173; 418/259
(58) Field of Classification Search
USPC ................ 137/98, 99, 109, 896, 897; 418/28, 418/152–153, 173, 259, 260–268
See application file for complete search history.

(56) References Cited

U.S. PATENT DOCUMENTS

| | | | | |
|---|---|---|---|---|
| 3,549,048 A | * | 12/1970 | Goodman | 222/57 |
| 4,257,440 A | * | 3/1981 | Hunter | 137/99 |
| 5,538,400 A | * | 7/1996 | Konishi et al. | 417/220 |
| 6,997,350 B2 | * | 2/2006 | Johnson et al. | 222/57 |
| 8,348,646 B2 | * | 1/2013 | Fujita et al. | 418/29 |
| 2009/0324438 A1 | * | 12/2009 | Veilleux, Jr. | 418/25 |

* cited by examiner

*Primary Examiner* — John K Fristoe, Jr.
*Assistant Examiner* — Reinaldo Sanchez-Medina

(57) ABSTRACT

The subject invention described herein is directed to an improved fluid powered system for dispensing a selectively variable proportion of additives into a primary fluid supply line such as is commonly encountered in the firefight industry where it is desirable to proportion foam concentrates into a water line. The subject invention features a water driven motor that is integral to a variable displacement additive pump. A proportioning adjustment allows the solution % to be adjusted. Once set, the additive percent varies in direct proportion to the water flow rate in order to maintain a nearly constant solution percentage over a broad flow range.

1 Claim, 6 Drawing Sheets

PUMP SECTION B-B (from sheet 3)
(shown at full stroke)

SECTION A-A

MOTOR SECTION C-C (from sheet 3)

PUMP SECTION B-B (from sheet 3)
(shown at zero stroke)

PUMP SECTION B-B (from sheet 3)
(shown at full stroke)

ADDITIVE PROPORTIONING SYSTEM

CROSS-REFERENCE TO RELATED APPLICATIONS

This patent application chums the benefit of U.S. Provisional Patent Application No. 61/527,148, filed on 25 Aug. 2011.

| PRIOR ART REFERENCES | | |
|---|---|---|
| 4,436,487 | March 1984 | Purvis, et al. |
| 4,321,938 | March 1982 | Siller |
| 6,533,557 | March 2003 | Williams |
| 4,541,450 | September 1985 | Bron |
| 6,766,863 | July 2004 | Arvidson, et al. |
| 6,454,540 | September 2002 | Terefinko, et al. |
| 6,725,940 | April 2004 | Klein, et al. |
| 6,009,953 | January 2000 | Laskaris, et al. |
| 7,703,543 | April 2010 | Waters, et al. |
| 7,997,348 | August 2011 | Hosfield, et al. |
| 4,448,256 | May 1984 | Eberhardt, et al. |
| 7,367,361 | May 2008 | Steingass |
| 5,909,775 | June 1999 | Grindley |
| 8,196,780 | June 2012 | Ophardt, et al. |
| 5,979,564 | November 1999 | Crabtree |
| 7,066,353 | June 2006 | Hammonds |
| 6,886,639 | May 2005 | Arvidson, et al. |
| 5,143,257 | September 1992 | Austin, et al. |
| 6,065,940 | May 2000 | Fleischer, et al. |

STATEMENT REGARDING FEDERALLY SPONSORED RESEARCH OR

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Many systems require the dispensement of additives into the primary fluid flow in order to alter the characteristics of she resulting solution. For example, in the residential arena it is desirable to be able to inject such additives as pesticides, fertilizer, detergent, etc., depending upon the application, into a water line. In the firefighting industry it is advantageous to be able to inject foam concentrates into a water line to aid in the suppression or extinguishment of fire.

One type of household sprayer is the garden sprayer which is based upon the venturi principle. This type of sprayer is used to apply pesticides and/or fertilizers to lawns and gardens. It is comprised of an inlet hose connection, a venturi device, an additive source, and a discharge nozzle. This type of device may be referred to as an atmospheric eductor. This means that the additive is at atmospheric pressure. In principle high pressure water (Between 40 to 75 psi, for most residential systems) enters through the inlet connection. The water then passes through a venturi jet. The venturi jet is a conical or tapered shape, in its most efficient design. The water is forced to pass through a smaller tapered area. In order to do so, the velocity of the water increases. This increase in velocity causes the water pressure to drop. When the water pressure drops below zero gauge a low-pressure zone is created (i.e. Vacuum). The additive is "sucked" into this low-pressure zone by atmospheric pressure where it mixes with the incoming "drive" water. Those skilled in the art often refer to this as an eductor. The solution (drive water plus additive) then travels to the discharge nozzle and exits. This type of system typically experiences a permanent pressure loss of 30 to 40%. Since nozzle range is dependent upon pressure, this results in poor performance and range of the discharge. The lawn and garden hand nozzles have superior range and discharge pattern when compared to a sprayer, provided water pressure is adequate. This is due to the greater energy, or pressure, being available to the nozzle. Because of the sprayer pressure limitations, a conventional nozzle cannot be connected to the sprayer, it would not pick-up additive. The present invention discloses an additive supply system that represents a negligible (approximately 10%) pressure loss and allows the operator to employ conventional "End of Line Devices" (EOLD) such as those discussed herein. These devices have superior reach and effectiveness. This system can be located anywhere in the water hose line and has the additional potential benefit of relieving the operator from the burden of carrying the "additive container".

Additionally, this type of system (garden sprayer) is essentially designed around one target flow rate. Therefore, the rate of additive flow is relatively constant. If the drive water flow rate is lower (due to lower available water pressure) the proportioning may be rich since the amount of additive remains nearly constant. If the flow rate is above the design point (available water pressure is high), the system will be lean due to the increase in drive water (the proportioning rate will be low). Hence this type of device will not accurately proportion and therefore has a limited operating flow range. The present invention will maintain a nearly constant proportioning rate across the entire design flow range.

Since water is the primary fluid used in firefighting, it is often advantageous to employ water driven mechanisms that can supply foam concentrate into the primary water line. Numerous mechanisms exist in the firefighting industry that are designed to add foam concentrate to the waterline, but not all are water powered. Some of these systems are portable, while others are mounted in mobile equipment or are designed as a fixed installation. Many of these systems feature some type of metering control that allows the percent of concentrate entering the waterline to be controlled from 0 to 6%. The most common and basic of the portable mechanisms are eductors. An example of this type of apparatus would be the model 241-60 from Elkhart Brass Manufacturing Company. These type devices utilize the venturi principle similar to the design mentioned above. A foam source is connected to the suction port typically via a metering valve. These devices are relatively inexpensive, and are water driven, but they have a set flow rate, and they create a permanent pressure loss of 30 to 40% as mentioned above. Because of this, they require a higher inlet pressure to compensate for this pressure loss and they are very sensitive to the amount of pressure that can be downstream of the eductor. If the wrong nozzle (or EOLD), or too much hose, or too small a hose diameter is connected between the nozzle and the eductor, performance will suffer and it may stop picking up additive/foam altogether.

Many of the more sophisticated firefighting foam systems on the market utilize a foam pump to raise the foam pressure of the team concentrate so that it can be infected into the water line. These pumped foam systems all use fixed displacement pumps to pump the concentrate. Fixed displacement pumps have good volumetric efficiency characteristics with very flat pressure-to-flow performance curves, which make them the pump of choice for foam system manufactures. Since fixed displacement pumps displace a fixed volume per revolution, the desired discharge flow rate must be controlled by one of two ways: control the input speed to match demand or have no speed control and divert the excess.

Numerous schemes exist on the market for controlling the input speed. The relatively small systems typically rely on electric motors with electronic speed controls. An example of this type of system would be the FoamLogix System manufactured by Hale Products in Conshohocken Pa. The larger systems typically employ a hydraulic transmission with electronic controls to control the pump speed and thus the output flow rate. An example of this type of system is the Servo Command System manufactured by National Foam in Exton Pa. These systems can handle broad pressure and flow ranges, have little to moderate pressure loss (typically ranging from 5 to 10%), and are not sensitive to back pressure. However, they all require a dedicated drive source (electric, hydraulic, engine, etc.) and are not driven by the flow of the primary fluid, which for firefighting purposes is generally water. These systems tend to cost more, require more maintenance, are more complex, and less reliable. The present invention accomplishes the same feats by varying the pump speed proportionally to the flow rate. In addition, the present invention is less complicated thereby improving reliability and reducing cost.

Systems that employ a fixed displacement pump and divert the excess flow to the suction side of the pump or back to the foam tank are known as "bypass" type systems. Control for these systems may be mechanical, electric, or a combination of the two. An example of this latter type would be the Feecon Balance Pressure Foam System manufactured by Kidde-Fire in Exton Pa. These systems can also handle a broad pressure and flow range, have moderate pressure loss (typically ranging from 5 to 10%), and are not sensitive to back pressure. They usually consist of a direct drive arrangement, where the drive, or power source, is connected directly to the foam pump. Therefore the drive system is usually simple compared to their speed controlled counterparts. However, like the speed controlled systems mentioned above, they all require a dedicated drive source and are not portable and are still subject to increased cost, maintenance, complexity, with less reliability. In addition these systems are less efficient since they create excess foam that most then be dumped back to a tank or to the pump suction. This comprises a waste of energy. The present invention offers the same broad choice of capabilities (proportioning rates and pressure/flow ranges) without the wasted energy or complicated drive and control systems.

Another type of system on the market is that of a water motor that is coupled to a foam pump. An example of this type of system is the FireDos system marketed by ThermoGel. This system is completely water powered. It uses a fixed displacement water motor to torn a fixed displacement foam pump. This system may be portable and water driven like the eductor, but it is not sensitive to downstream pressure and it can handle a broader operating range. It is not as complicated, and does not require a separate source of power like the other pumped systems. However, it uses a fixed displacement foam pump and therefore suffers the same drawbacks as the bypass type pump systems mentioned above. In addition, the controls for divesting the excess foam, along with the pump and motor combination being joined via a coupling, make for a bulky arrangement. The present design has all the positive features of this device, but utilizes a variable displacement additive pump which makes for a more efficient design since no foam is bypassed. This results in less pressure loss in the system and snore pressure available to do positive work, such as improved nozzle range. One method employed in the FireDos system to select the proportioning rate is to employ a multi-piston positive fixed-displacement pump. This only allows for discrete step-wise rate selections. For example a pump may feature three cylinders. In operation one or two of the cylinders could be diverted to bypass foam back to the suction side. For example this may allow foam proportioning rate selection of 1% (two cylinders diverted), 2% (one cylinder diverted), or 3% (no cylinders diverted). The present invention offers a further advantage in that the proportioning rate is not step wise and can be infinitely varied between 0 and 3% for example.

A snore recent player in the foam market is Matte Maskin of Norway also marketed by INNOVFOAM. Matte Maskin uses a reaction type turbine to turn a fixed displacement foam pump. Turbines, like centrifugal pumps, suffer from a condition known as slip. This means that the proportioning will be greatly affected by the operating pressure and or the foam demand. Therefore, these systems have a narrow pressure operating range and typically operate at one fixed foam % setting.

SUMMARY OF THE INVENTION

In form, the present invention is represented by a fluid driven motor that is integral to a variable displacement pump. One unique attribute of the present invention is that the additive pump output has the capability of being infinitely varied from zero flow to a predetermined maximum such as 6%. This configuration will also permit a reverse flow condition if so designed. In operation of the preferred embodiment, the fluid motor speed is in direct proportion to the rate of flow (also referred to as drive and/or motive flow) passing through it (neglecting any internal volumetric losses as they are typically minor on positive displacement equipment). For example, the configuration could be such that the motor turns two revolutions for each gallon of water that passes through it. At a flow rate of 100 gpm this would be an output speed of 200 rpm. This would then be the input speed to the integral variable displacement pump. If the variable displacement pump were designed so that at maximum displacement it moved 0.05 gallons per revolution, it would then supply 10 gpm of additive at 200 rpra. This would allow for a solution proportioning rate of approximately 9% (10 gpm additive/(100 gpm motive fluid+10 gpm additive)). At these same operating parameters, the additive pump displacement could be adjusted to half of its potential or 0.025 gallons per revolution. Now the output would be 5 gpm of additive for a solution rate of 4.5%. This represents an advantage over the fixed displacement configuration in terms of energy conservation. The prior art design would require the maximum amount of energy, no matter what the additive demand was. This results in additional pressure drop in the primary fluid stream. In the example cited above, the prior art motor would have to supply the pump based on the maximum demand of 9%, even if the proportioning requirement was only 4.5%. Therefore, the proposed design would require 50% less energy under these conditions which in turn would result in half the pressure loss to the motive or drive fluid.

This invention incorporates a further advantage over the prior art of fluid driven mechanisms. Many of the additives on the market, and certainly a good many of the firefighting concentrates are thixotropic fluids. Thixotropic fluids are more viscous (i.e. thicker) when they are stationary and most (if not all) become more viscous at colder temperatures. For the metering valves used in the educted and pumped systems of the prior art, as well as the prior art thud driven motor type, this presents a problem. It often causes the devices to proportion lean and they may not function at all. The present device is designed to readily pump thixotropic additives.

One method employed in the prior art water motor to select the proportioning rate was to employ a multi-piston positive fixed-displacement pump. This only allows for discrete step-wise rate selections. For example a pump may feature three cylinders. In operation one or two of the cylinders could be diverted to bypass foam back to the suction side. For example this may allow foam proportioning rate selection of 1% (two cylinders diverted), 2% (one cylinder diverted), or 3% (no cylinders diverted). The current invention offers a further advantage in that the proportioning rate is not step wise and can be infinitely varied between 0 and 3% for example.

The preferred embodiment of the present invent offers yet a further advantage in that the pump mechanism is simpler in design than traditional hydraulic variable displacement vane pumps (VDVP) such as the model VVS by Eaton Mfg. company located in Eden Prairie, Minn. Typical VDVPs feature an internal liner that moves internally independent of the outer housing. This not only represents more complexity but sealing issues between the high pressure and low pressure sides of the pump. The present preferred embodiment features a liner that is rigidly fixed to the outer housing and the whole housing/liner assembly translates in order to alter the pomp stroke/output. Since there is no movement between the internal liner and the housing, it is easier and more reliable to seal the high pressure side from the low pressure side. It also makes for a more compact and light weight design. The weight is further reduced in that the present invention is designed to have a maximum design pressure around 500 psi, where as a traditional hydraulic VDVP may operate up to 3500 psi. Further the present invention is capable of pumping a broad range of fluids where as traditional VDVPs are limited to hydraulic fluid. Yet a further advantage of the present invention is that the motor assembly as well as the pump assembly can be constructed to accommodate debris in the drive or additive fluids on the order of magnitude of 0.25" compared to the 20 micron neighborhood in a typical hydraulic system.

DETAILED DESCRIPTION OF THE INVENTION

Figure 1:
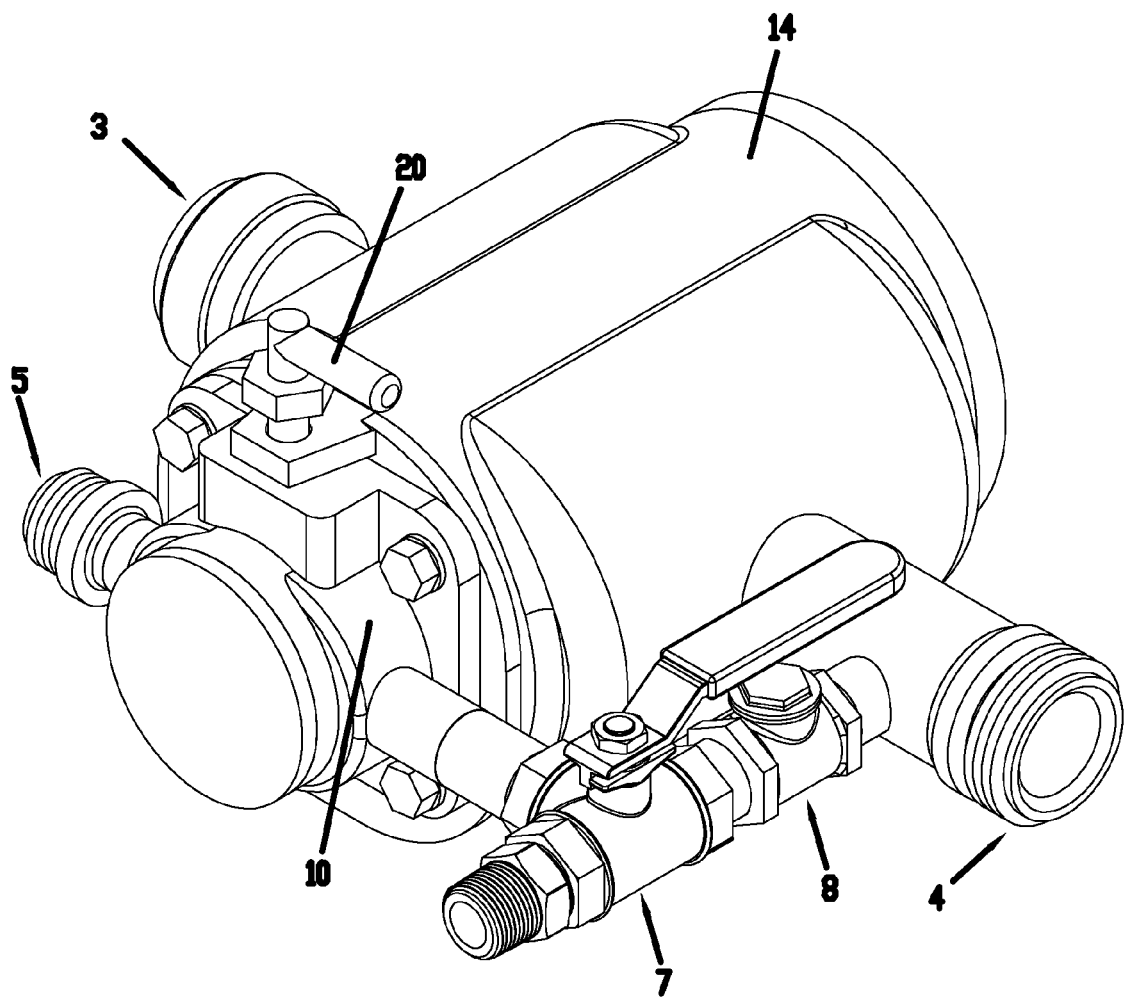
FIG. 1 is an isometric view of the Additive Proportioning System (APS) in accordance with one embodiment of the subject invention.
Figure 2:
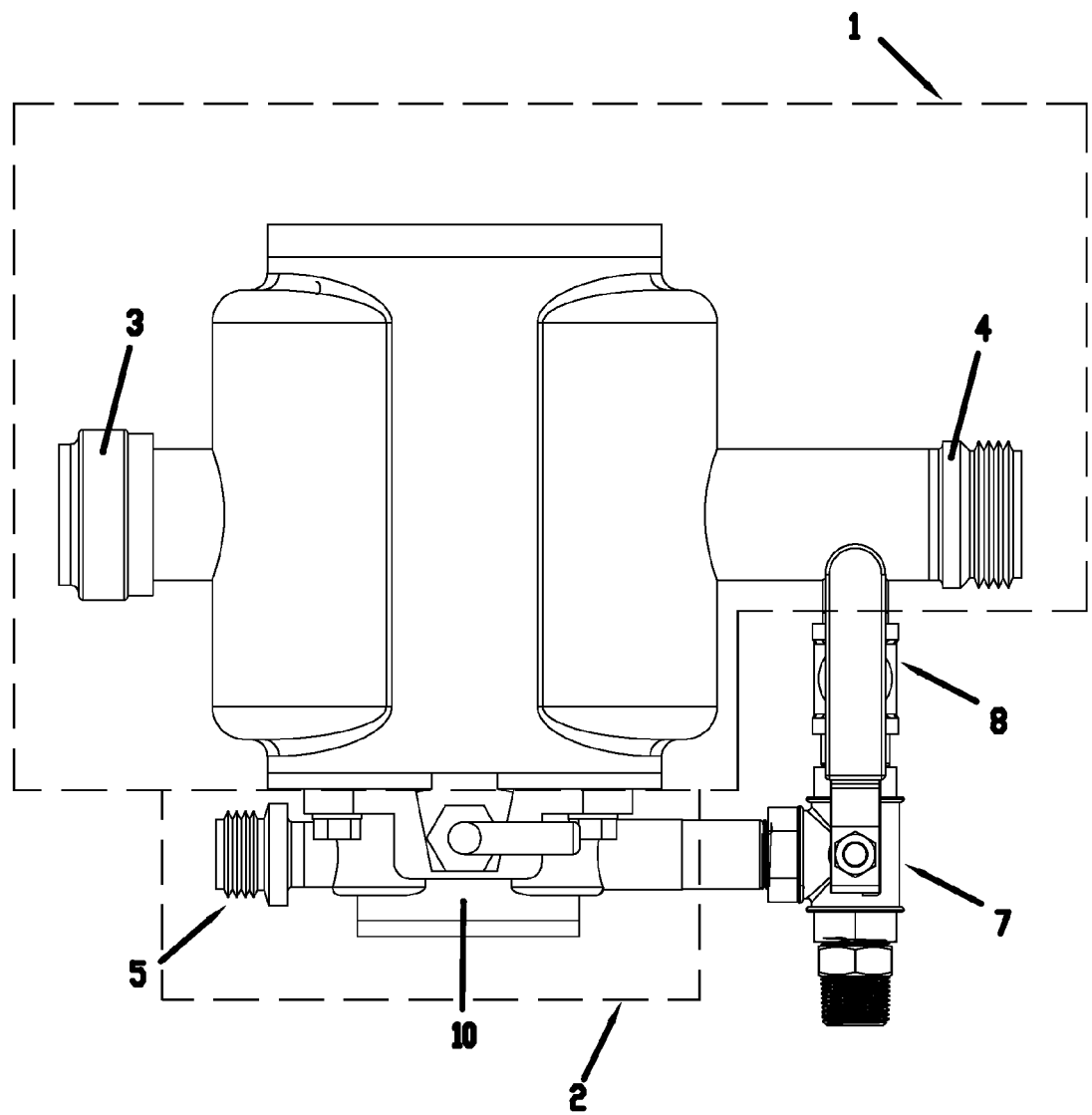
FIG. 2 is a plan view of the APS in accordance with one embodiment of the subject invention.

In order to understand how the present apparatus is designed, the preferred embodiment will be discussed herein with reference to the included figures. FIG. 1 is an isometric view of the entire assembly of the subject invention which indicates the two primary components, a motor assembly 1 and a pump assembly 2. The two primary components are further indicated in FIG. 2. In operation, a primary motive fluid, such as water, would enter via the fluid coupling 3, then it would pass through the interior of the motor end and the solution would exit through a solution conduit/discharge port 4. An additive inlet port 5 would be connected via a conduit to the additive of choice. The additive would pass through the housing 10 of the pump end 2 where upon the pressure would be increased to that of the solution conduit 4. The additive is in fluid communication with the motive from the motor via conduit assembly 6. Conduit 6 contains a selector valve 7 which can be used to vent air and to direct additive to solution conduit 4. Conduit 6 also contains a check valve 8 feature to prevent fluid from solution conduit 4 from entering the pump 2.

Figure 3:
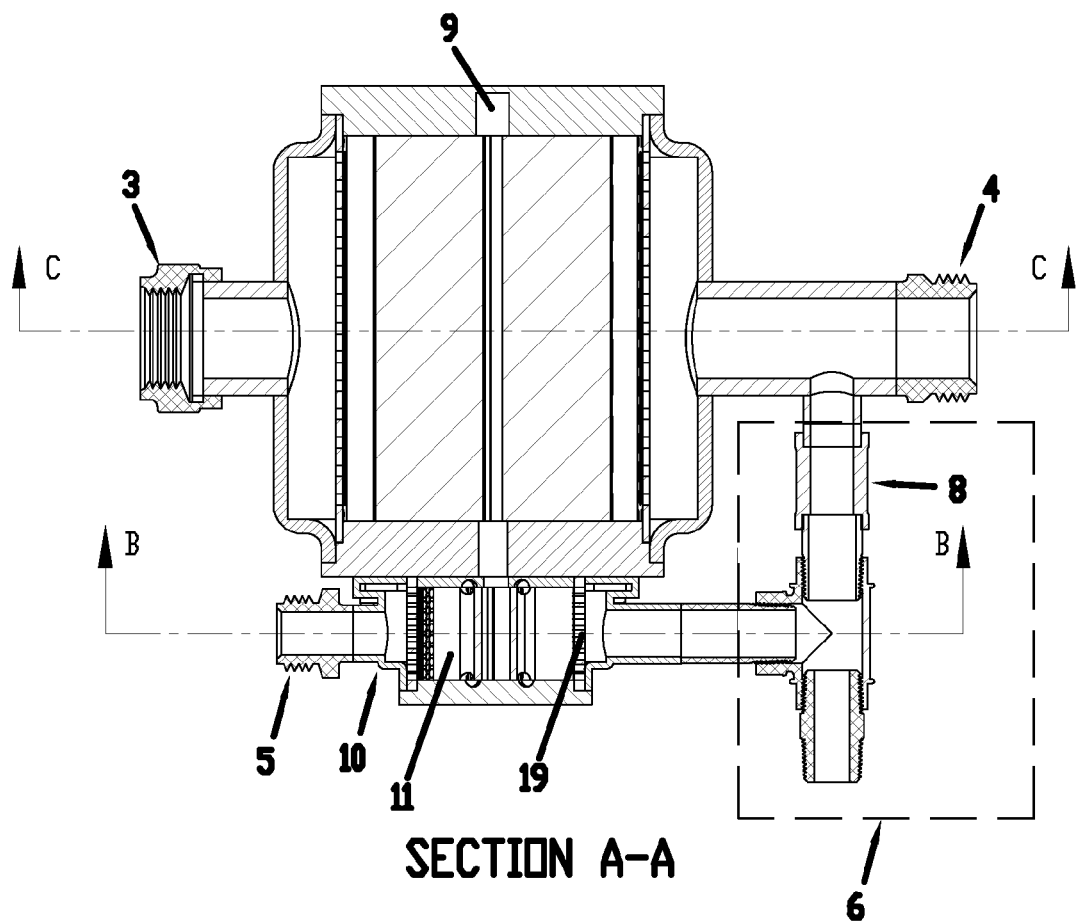
FIG. 3 is a front view and associated cross-section of the APS in accordance with one embodiment of the subject invention.
Figure 3:
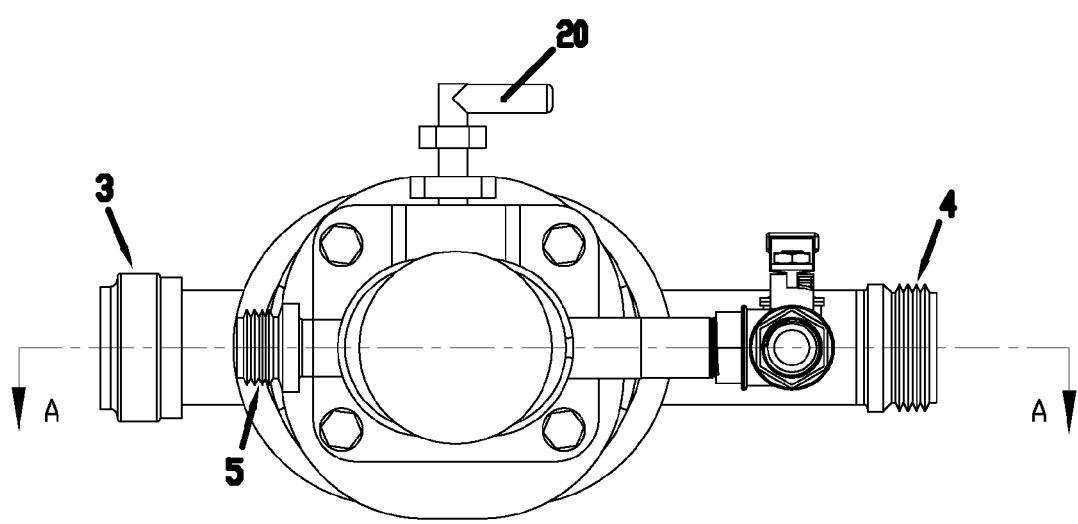

FIG. 3 is a plan view of the subject invention in cross section where upon the two primary components, pump assembly 2 and motor assembly 1 can be seen. As illustrated in FIG. 3, shaft 9 is common to both the motor assembly and the pump assembly. A stroke control adjusting mechanism 20 allows the pump housing 10 and liner 19 to move independent of the rotating assembly comprised of the shaft 9, pump rotor 13, and pump vanes 12. The pump housing 10 is attached to the motor assembly via the flange face of the pump housing which is slotted to permit movement. The pump end is secured to the motor assembly via low friction shoulder bolts 18 which are configured to permit movement yet maintain a seal between the translating pump housing flange and the motor end plate 21. This permits the rotating assembly to be positioned concentric with the pump liner 19 as illustrated in FIG. 5 for a zero flow state or adjusted to an eccentric state as illustrated in FIG. 6 to the point of maximum flow as further explained below.

Figure 4:
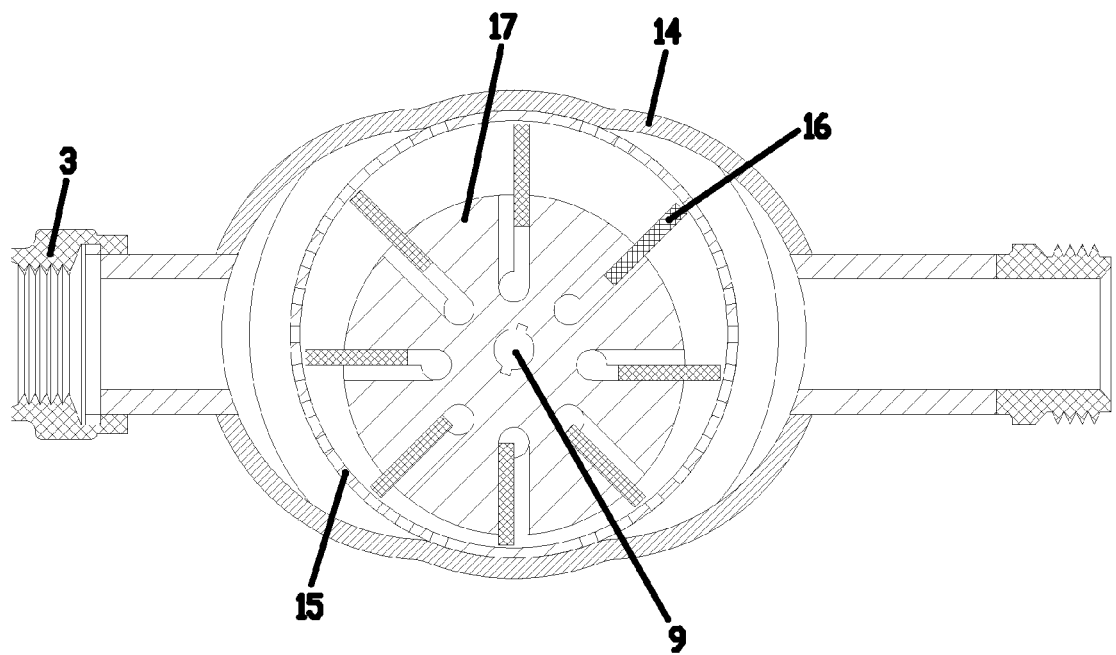
FIG. 4 is a side elevation view in cross-section of the motor end of the apparatus shown in FIG. 3.

As rotational energy is extracted from the motor assembly it is transferred via shaft 9 to the pump rotating assembly. Further detail can be seen by referring to FIG. 4 which indicates a cross section cutaway of the motor assembly. The motive flow enters from the primary fluid coupling 3 where it passes through the inlet of motor housing 14. It then passes through the perforated motor liner 15 that acts to define the boundary of the rotating vanes 16. Once the motive fluid passes through the motor liner 15, the pressure of the motive fluid acts on a plethora of motor vanes 16. The surface area of the vanes toward the bottom of motor is greater than the surface are of the vanes in the upper portion of the motor as depicted in FIG. 4. This difference in surface area causes the rotating assembly (comprised of the rotor 17, shaft 9, and vanes 16) to rotate in a counter clockwise direction as presented in FIG. 7. As the motive moves toward the outlet conduit 18, the vanes are forced to contract against the motor liner 15 which is getting smaller as the vanes rotate from the bottom center to the top center. As the motor vanes 16 contract, the cavity formed by the liner 15 and the motor vanes 16 becomes smaller. This in turn forces the motive fluid out through the perforated liner 15 and the outlet conduit 4 of the motor assembly housing 14.

Figure 5:
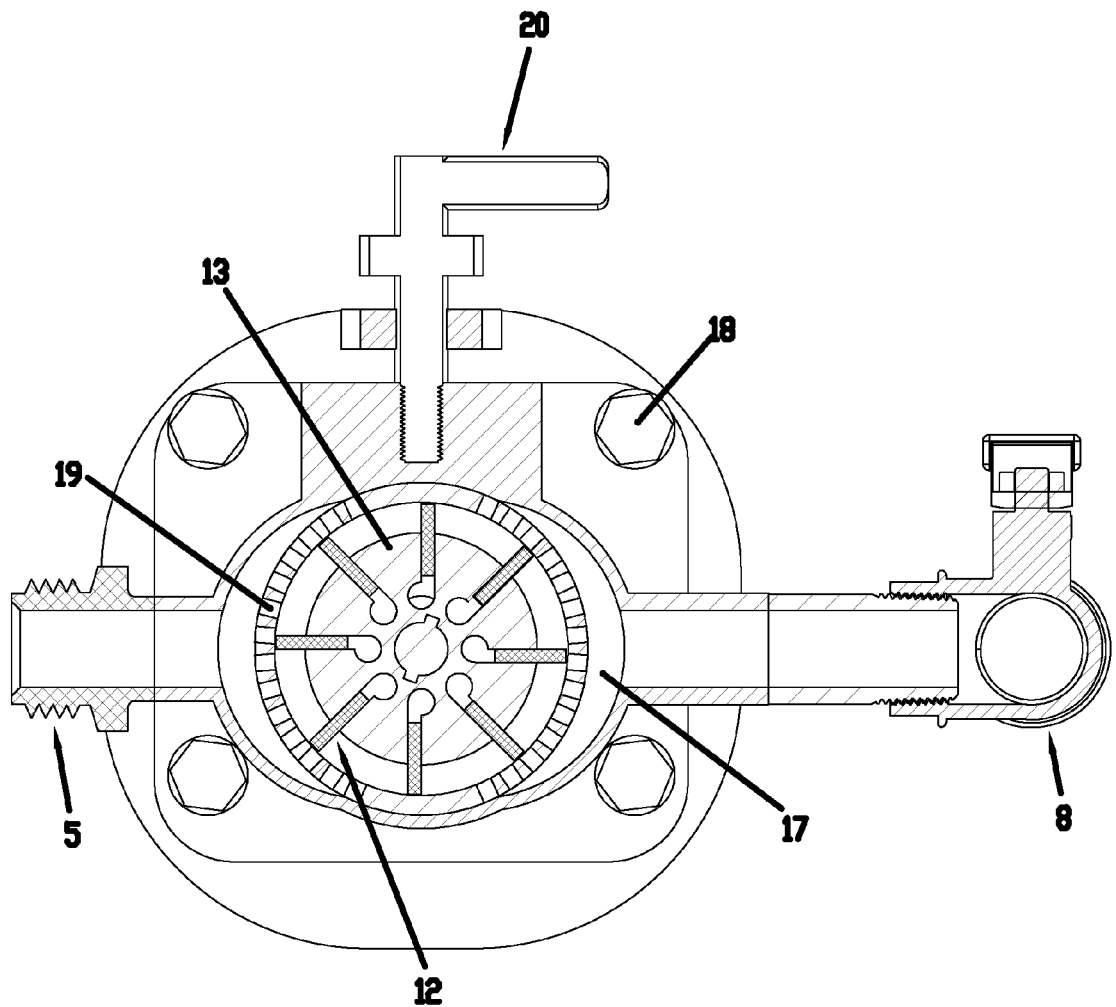
FIG. 5 is a side elevation view in cross-section of the pump end of the apparatus shown in FIG. 3 at zero stroke (0 flow rate).
Figure 6:
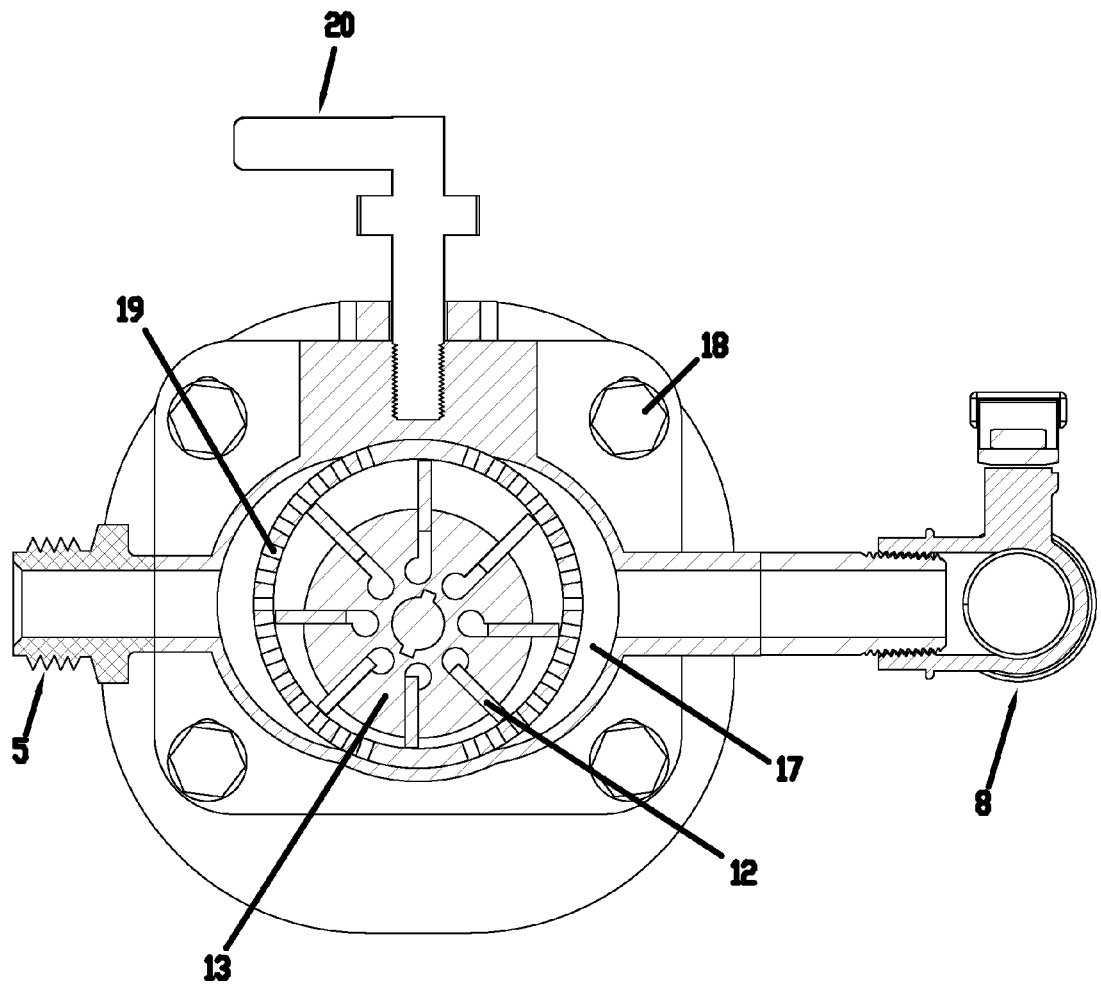
FIG. 6 is a side elevation view in cross-section of the pump end of the apparatus in FIG. 3 at full stroke (maximum flow rate).

FIGS. 5 and 6 are an elevation view in cross section of the pump assembly of the subject invention. FIG. 5 represents the current invention in a state of zero flow or zero stroke. FIG. 5 also represents the pump assembly 2 in a concentric condition where the shaft 9, the liner 19, and the rotor 13 are all centered. As the shaft 9 (which is in direct communication with the motor assembly 1) is forced to rotate it carries the rotor 13 and the associated pump vanes 12 with it. Since the pump vanes maintain a constant stroke no additive is being drawn into, or being pumped out of, the pump assembly 2.

FIG. 6 is an elevation cross section of the subject invention in the full stroke position. By adjusting the stroke control adjusting mechanism 20 to increase output, the liner 19 is forced down. This places the liner 19 in an eccentric position relative to the shaft 9 and the pump rotor 13. Again the rotational energy from the motor assembly 1 forces the shaft 9 and pump rotor 13 to rotate. However, since the liner is now in an eccentric position the vanes 12 experience a change in stroke. As the vanes 12 move from the top dead center (TDC) position to the bottom dead center (BDC) they extend. The trapped area formed between any two vanes 12 and the liner 19 is increasing thereby creating a low pressure zone. Therefore, the additive is "sucked" into this low pressure zone via the perforation holes in the liner 19. Once the vanes 12 pass the bottom most position they begin to retract as they rotate toward the TDC position. This forces the vanes 12 to contract. The cross sectional area formed between any two consecutive vanes 12 and the liner 19 is ever decreasing as the vanes approach TDC. This lends to raise the pressure of the additive and forces it oat through the perforation holes in the liner 19. The fluid then flows through pump housing 10 and through conduit assembly 6 into the solution conduit discharge 4.

The invention claimed is:

1. An additive proportioning system for a fluid system, comprising:
   a. A motor assembly that is driven by a primary fluid
   b. An additive pump assembly that is in communication with the motor assembly and rotates proportional to the motor assembly output speed;
   c. The additive pump assembly with an intake and an outlet, wherein the rate is adjustable for flow rates from a minimum value to a maximum predetermined value;
   d. A passageway for fluid communication between an additive output and the primary fluid, and wherein the additive pump assembly further comprises: a pump of a variable displacement design; a pump end is on a common shaft with a motor end of the motor assembly; the displacement of the pump is affected by adjusting a pump liner relative to the shaft which remains in a fixed although rotational position; and a pump outer housing that with the liner move together as a unit to effect the displacement.

* * * * *